April 21, 1964  C. W. KIESBAR ETAL  3,129,980
PNEUMATIC CONVEYING APPARATUS
Filed Dec. 5, 1960  5 Sheets-Sheet 1

INVENTOR.
LEO G. WELLER
CHARLES W. KIESBAR

April 21, 1964 C. W. KIESBAR ETAL 3,129,980
PNEUMATIC CONVEYING APPARATUS
Filed Dec. 5, 1960 5 Sheets-Sheet 2

INVENTOR.
LEO G. WELLER
CHARLES W. KIESBAR

INVENTOR.
LEO G. WELLER
CHARLES W. KIESBAR

United States Patent Office 3,129,980
Patented Apr. 21, 1964

3,129,980
PNEUMATIC CONVEYING APPARATUS
Charles W. Kiesbar and Leo G. Weller, Catasauqua, Pa., assignors to Fuller Company, a corporation of Delaware
Filed Dec. 5, 1960, Ser. No. 73,840
3 Claims. (Cl. 302—23)

The present invention relates to the pneumatic conveying of pulverulent or granular materials, and is more particularly concerned with the transfer of such materials between bulk containers.

In many areas, large bulk-solids containers, such as railway cars, cannot be brought close enough for direct unloading to the plants where the materials are to be used. Therefore, the material must be transhipped by other means such as trucks, which generally are of lesser capacity.

In other cases, a plant may have two or more bulk stations or container installations spaced from each other a sufficient distance to require two separate unloading systems of a permanent type.

The present invention relates to a portable pneumatic-conveying transfer unit capable of transferring material from a railway car to a truck, or from any container or bin to another. Prior attempts at such transfer units have enjoyed varying success, but none have been found to be entirely satisfactory.

In general, the preferred form of the present invention comprises a separator having first and second separating stages each having a material-gas inlet, a gas outlet, and a material outlet. The inlet of the second separator stage is in communication with the gas outlet of the first stage, while the gas outlet thereof communicates with the inlet of a blower. The blower has a gas supply duct extending therefrom which delivers a stream of gas to a discharge assembly which includes a conveying duct served by a material feeder. The material feeder receives material from the material outlet of the first separator stage.

The second separator stage includes means for separating solids from the gas stream as it passes from the inlet to the gas outlet. The trapped material in the second separator stage may be collected separately or may be admixed with the material from the first separator stage.

A source of power is arranged to drive the blower and the material feeder. An overload means associated with the material feeder interrupts the transmission of power to the material feeder if a jam should occur therein. Preferably, the overload means includes means to interrupt the transmission of power to the blower.

A better understanding of the invention may be derived from the accompanying description and drawings, in which.

Figure 1:
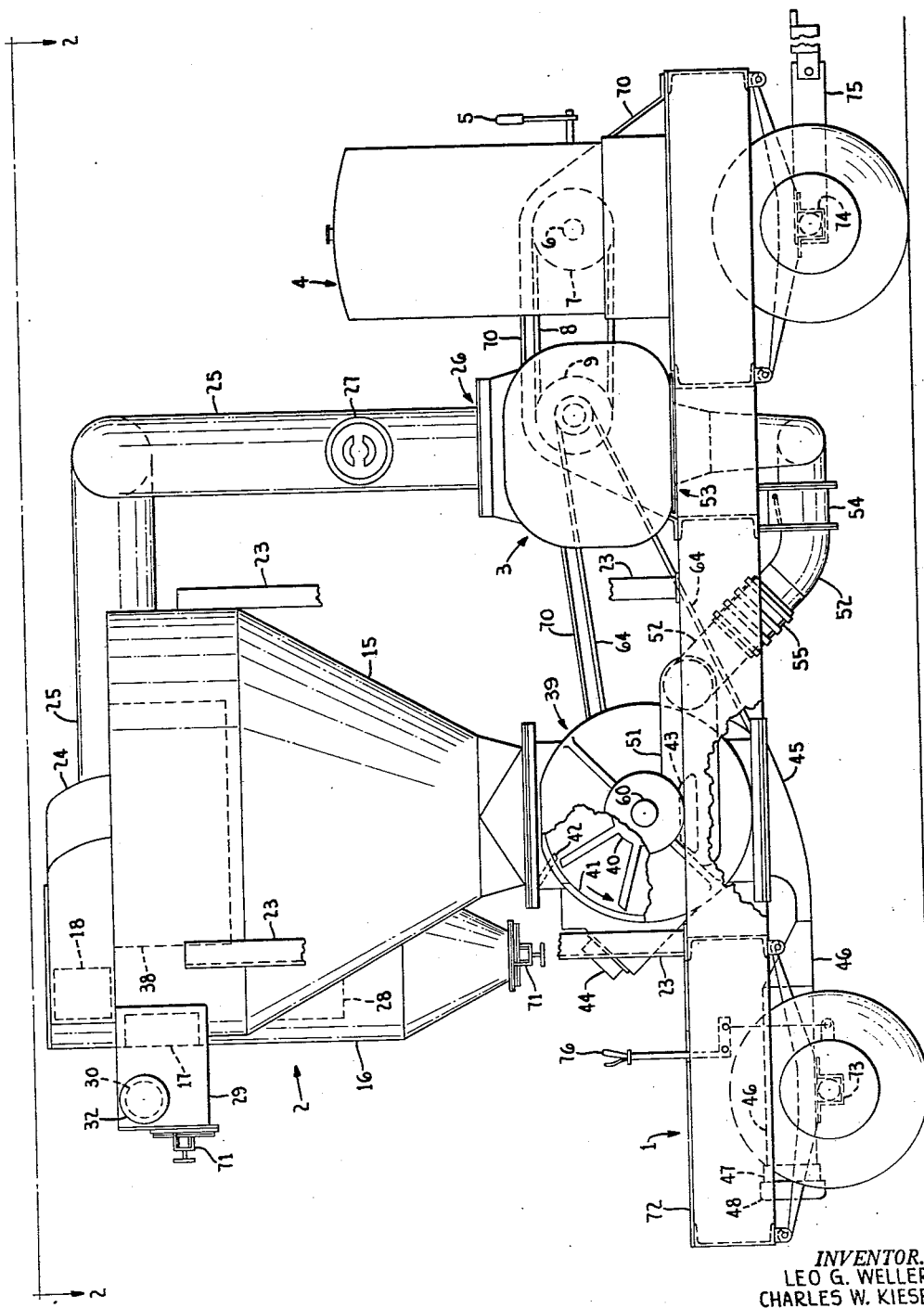
FIG. 1 is a side view of a transfer unit embodying the invention.
Figure 2:
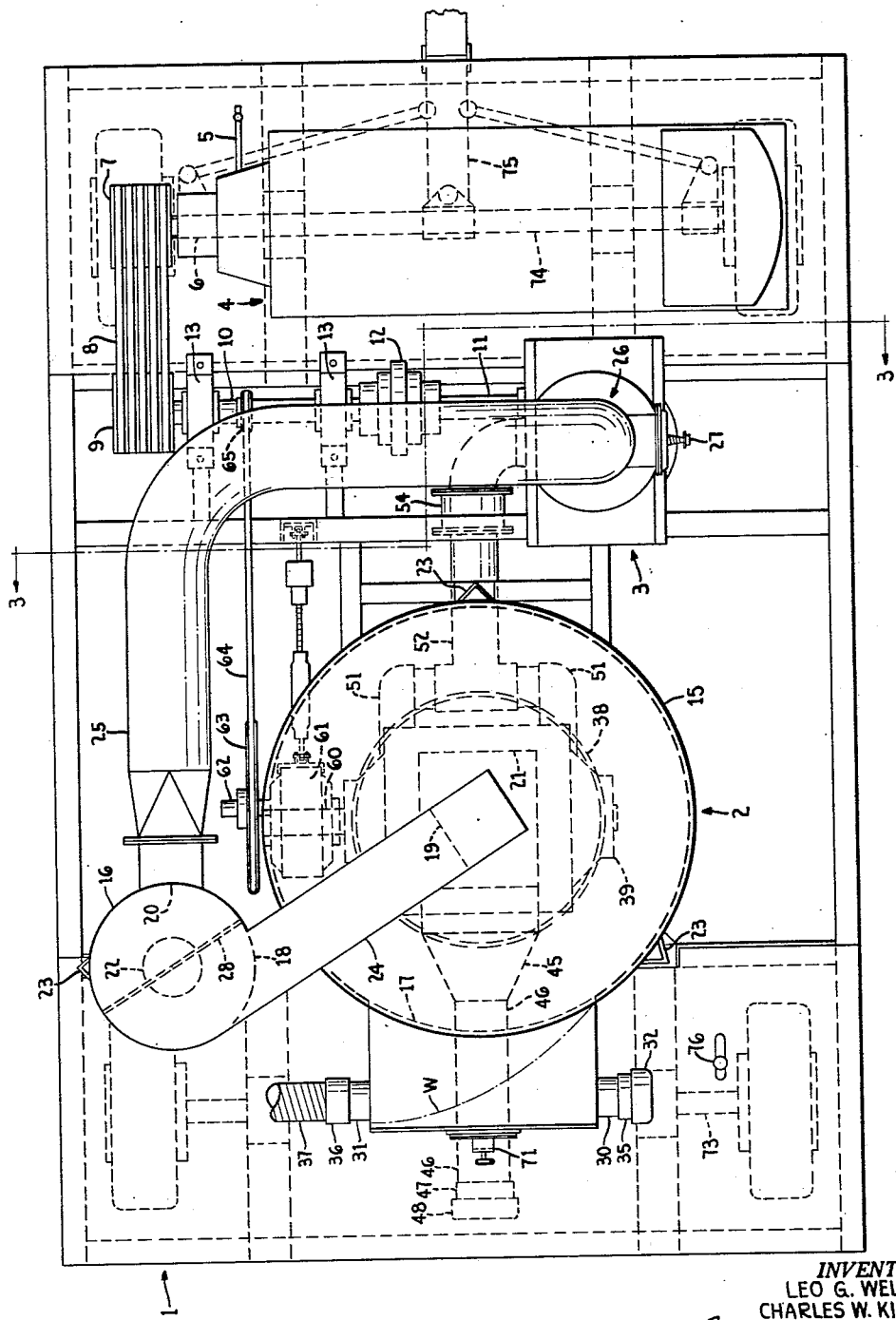
FIG. 2 is a plan view of the unit of FIG. 1.
Figure 3:
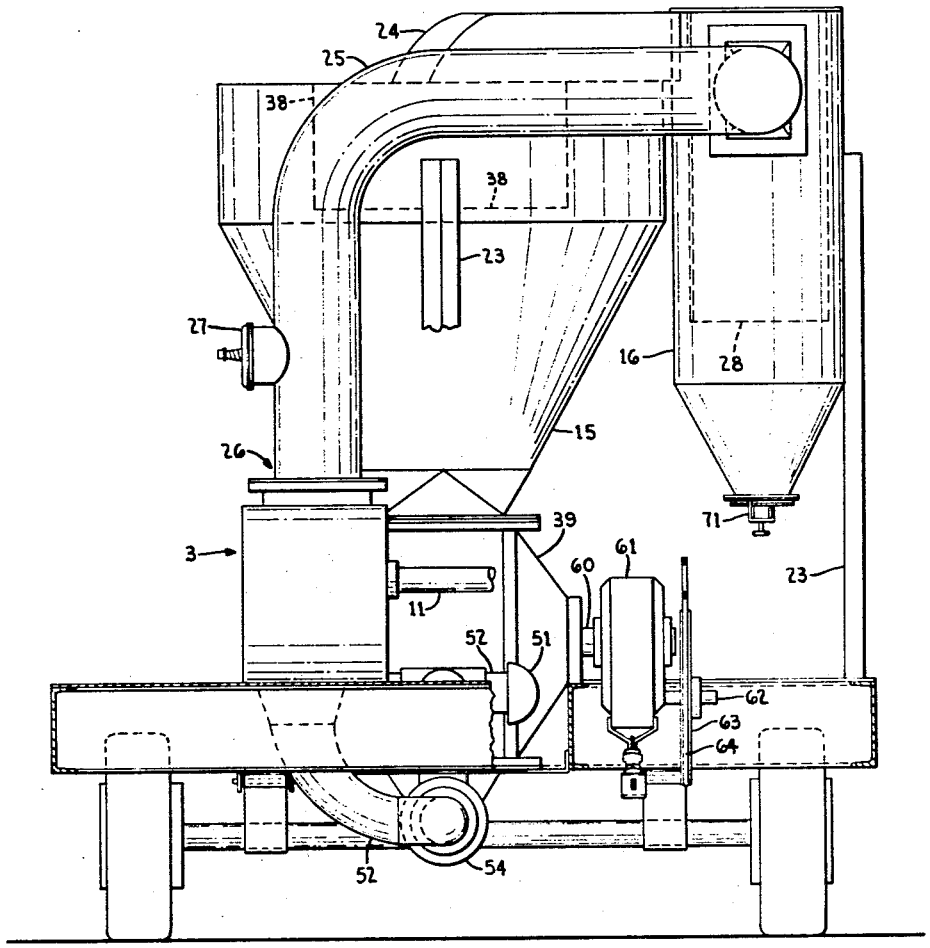
FIG. 3 is an end view, partly in section, of the unit of FIG. 1.

The preferred form of the invention, as embodied in an agricultural grain transfer unit, is shown in FIGS. 1–4. As shown in these figures, the transfer unit comprises a chassis 1 carrying a separator assembly 2, a blower 3, and an engine 4.

The engine 4 has a clutch controlled by a clutch handle 5 secured to a shaft 6 which carries a V-belt sheave 7. V-belts 8 extend from the sheave 7 to and around a similar sheave 9 on a transfer shaft 10 aligned with the input shaft 11 of the blower 3 and engaged therewith by a coupling 12. The shaft 10 is mounted on the chassis by a pair of suitable bearings 13.

The separator assembly 2 includes first and second separator stages 15 and 16, respectively. The separator stages 15 and 16 each have inlets 17 and 18, gas outlets 19 and 20 and material outlets 21 and 22, respectively. The separator assembly is secured to the chassis by a plurality of braces 23.

The inlet 18 of the second separator stage communicates with the gas outlet 19 of the first separator stage via a conduit 24, while its gas outlet 20 communicates via an exhaust conduit 25 with the gas inlet 26 on the upper side of the blower 3. The exhaust conduit 25 has a vacuum relief valve 27. The second separator stage has a baffle 28 separating the inlet 18 from gas outlet 20 adjacent the top thereof. The baffle 28 extends downwardly throughout a major portion of the height of the second stage.

The inlet 17 of the first separator stage 15 opens to an intake chamber 29 having opposed, selectively-usable intake pipes 30 and 31. The intake pipes 30 and 31 carry caps 32 for individually closing the pipes when they are not receiving material. The intake pipes may be provided with quick-couplings 35, 36 to aid in the connection of a flexible pickup hose 37.

The first stage 15 includes a cylindrical skirt 38 surrounding and extending below the gas outlet 19. The material outlet 21 communicates with a material feeder 39 which includes a pocketed rotor 40 in a casing 41. The casing 41 has a baffle 42 to wipe away excess material in overfilled pockets and prevent breakage or crushing of the material. The casing has a pair of air inlets 43 therein opposite from and aligned with each other on the ends of the casing portion adjacent the feeder outlet. A discharge fitting 45 communicates with the feeder outlet and leads to a discharge conveying duct 46. The end of the conveying duct 46 is provided with a quick-connect coupling 47, and has a cap 48 for closure during periods of non-use. Gauges 44 are grouped at one side of the feeder to indicate the pressures in the various ducts and pipes.

Branch pipes 51 of a gas supply pipe 52 extending from the gas outlet 53 of the blower 3 are connected to the oppositely-disposed air inlets 43. The gas supply pipe is provided with a check valve 54 opening toward the air inlets 43, and a flexible section 55, such as a rubber hose, to isolate the vibrations.

The material feeder rotor 40 is mounted on a shaft 60 which extends outwardly from the casing 41 a length sufficient to carry a speed reducer 61 mounted thereon. The speed reducer has a driven stub shaft 62 carrying a sheave 63 receiving a V-belt 64 from a sheave 65 on the transfer shaft 10.

Figure 4:
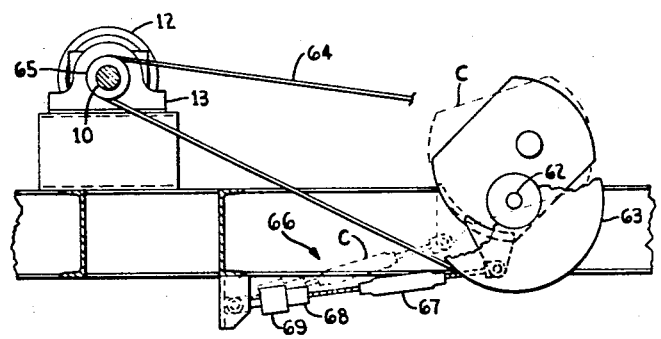
FIG. 4 is a side view, on an enlarged scale and partly in section, showing the power transmission and overload mechanism associated with the material feeder.

As best seen in FIG. 4, the speed reducer 61 is both secured against rotation and positioned to properly tension the V-belt 64 by a bracing link 66 hinged to the speed reducer casing at one end and to the chassis 1 at its other end. The bracing link includes a turnbuckle section 67, to adjust its overall length, and an overload release 68. The overload release may take any suitable form such as a spring-loaded catch which is operable to release the support of the turnbuckle section near the chassis, if the material feeder is jammed or overloaded. This shortens the bracing link to release the tension on the V-belt 64. The overload release 68 preferably includes a tilt switch or other suitable means such as a limit switch 69. The switch 69 is arranged to stop the engine 4, such as by grounding or short-circuiting a magneto, when the overload release collapses the bracing arm, as shown by dotted lines at C, to take tension off the belt 64.

The transmissions or drives 8 and 64 are covered by suitable guards 70 (FIG. 1). A plurality of normally-closed manual valves 71 are provided in the intake chamber 29 of the first and second separator stages 15 and 16 to provide access and to permit cleanout of material.

The chassis 1 includes forward and rear decks 72 and 72' mounted on wheeled axle assemblies 73 and 74. The wheels of the assembly 74 are steerable through a steering mechanism 75. A brake control handle 76 is located on the chassis within reach of both the deck 72 and the ground level.

In operation of the apparatus of FIGS. 1–4, one of the caps 32 or 33 is removed and the flexible hose 37 is coupled to the appropriate intake pipe 30 or 31, whichever is more convenient. The cap 48 is removed from the conveying duct and a similar hose or pipe is coupled to the coupling 47.

The engine 4 is then started and drives the blower 3 to draw air through the flexible hose 37, intake chamber 29, first stage 15, second stage 16, and the exhaust conduit 25. The air thus entering the blower is then forced under pressure through the gas supply pipe 52, branch pipes 51, air inlets 43 and through the aligned pockets of the rotor 40 to the conveying duct 46.

Material such as agricultural grain is then introduced to the system, as by inserting an extension of the flexible hose 37 into the material in a container such as a bulk railroad car, so that the stream of air flowing through the hose may entrain and carry the material into the intake chamber 29. The introduced material first forms a deposit of material at the remote side of the intake chamber, bounded in part by a protective, curved wall W. This wall then smoothly diverts subsequent material entering the chamber into the first stage 15 without impingement on the walls of the intake chamber, which otherwise might abrade or otherwise harm the material. In the first stage 15, centrifugal action separates normal grains from the air stream, as in common cyclone practice.

A relatively small amount of lighter or finer particles, such as chaff and dust, present in the material will be carried over through the conduit 24 into the second separator stage 16. However, the air passing through the second separator stage is forced to pass from the inlet 18 downwardly beneath the baffle 28 and then upwardly in order to reach the gas outlet 20. The carryover material is therefore thrown out of the turning air stream as it passes beneath the baffle 28. This material collects on the valve 71 at the bottom of the second separator stage 16 for subsequent cleanout. The cleaned air then passes from the second separator stage 16 through the exhaust duct 25 to the blower 3. From the blower 3, the air passes through supply pipe 52, branch ducts 51 to enter the rotor casing 41 through air inlets 43.

Material removed from the air stream at the first stage 15 is metered to the discharge fitting 45 and discharge duct 46 by the pocketed, rotating material feeder 39. The air stream from the inlets 43 enters the bases of the aligned pocket of the rotor and sweeps the material from the pockets into and through the discharge fitting 45 and conveying duct 46 to a second container, such as a truck, thereby completing the desired transfer.

If a foreign object in the material escapes the baffle 42 and wedges in the material feeder 39, or if it jams for any reason, the excessive power load causes the overload release 68 to collapse the bracing link 66, thereby removing the driving tension from the V-belt 64. Collapse of the bracing link 66 actuates the limit switch 69 to stop the engine 4, thereby stopping the blower 3. This prevents the blower 3 from continuing to draw further material into the system, which would plug the separator and damage the blower by overflow of material into it.

Figure 5:
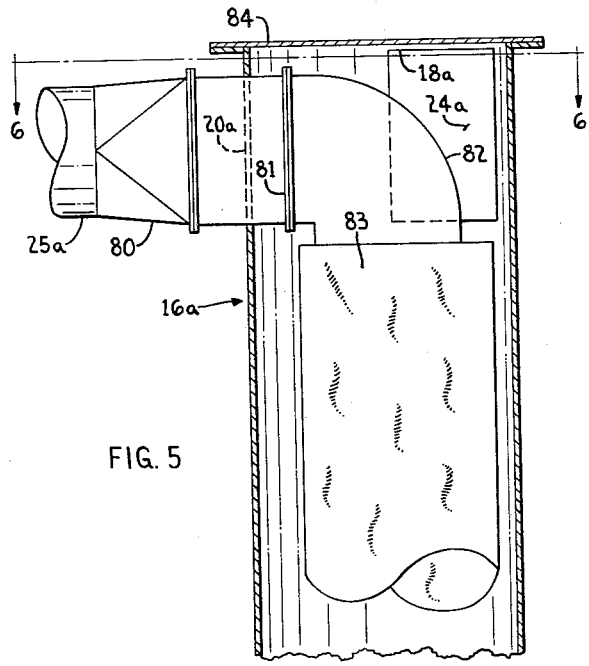
FIG. 5 is a sectional view showing a modified form of second separator stage.
Figure 6:
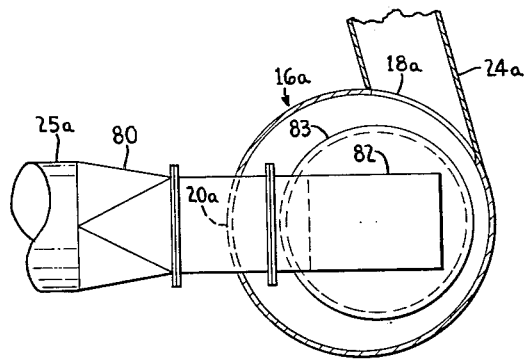
FIG. 6 is a section taken on line 6—6 of FIG. 5.

A modified form of second separator stage is shown in FIGS. 5 and 6 in which similar elements are identified by the same numerals, suffixed "a," as used in FIG. 1. As shown in these figures, the modified form comprises a second separator stage 16a having an inlet 18a served by a conduit 24a. The gas outlet 20a is provided with an outlet fitting 80 which communicates with the exhaust conduit 25a and terminates within the second stage as a flange 81. A duct elbow 82 is secured to the flange 81 and carries a closed-end tubular filter 83 extending downwardly in the second stage. The filter 83 may be formed of fabric or another suitable porous material. The top 84 of the second separator stage is removable to provide access to the filter 83.

In operation, the gas stream passing from the inlet 18a toward the outlet 20a is forced to pass through the wall of the filter 83 between the inlet and outlet. Material or dust present in the gas stream is positively filtered from the gas stream, so that the gas when re-used for conveying contains no contaminating fines or floss.

The form of second separator stage shown in FIGS. 5 and 6 is particularly advantageous when it is desirable to separate fine or light particles of material from the material being handled. This is particularly true in the case of plastics such as pelleted polyethylenes, which often tends to rub off into ribbons or fine streamers. These streamers, which are detrimental to later forming processes, are trapped by the filter 83 so that they cannot be carried with the gas to the main material stream in the conveying duct.

Figure 7:
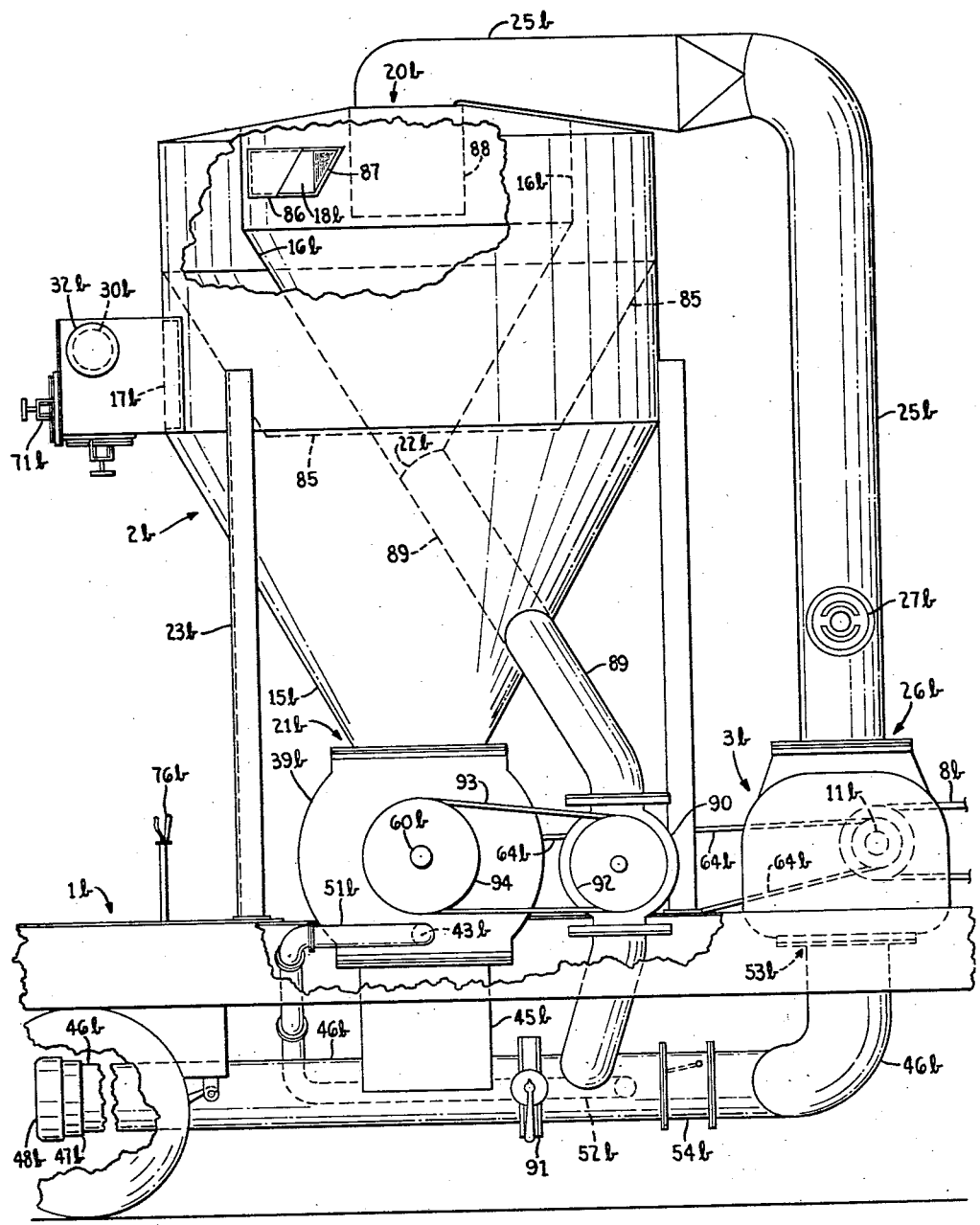
FIG. 7 is a side view, partly in section, of a modified form of transfer unit.

A modified form of transfer unit is shown in FIG. 7 in which the same numerals, suffixed "b," are used to identify elements similar to those of FIG. 1.

As shown in FIG. 7, the transfer unit comprises a chassis 1b carrying a cyclone separator assembly 2b, a blower 3b, and an engine (cut away for convenience).

The engine drives the blower 3b through V-belts 8b and a transfer shaft aligned with and coupled to the input shaft 11b of the blower.

The separator assembly 2b includes a first separator stage 15b enclosing a second separator stage 16b in its upper region. The first separator stage 15b includes a gas inlet 17b, a material outlet 21b, and an interior, tapered skirt 85 which prevents upward short-circuiting of the gas-material stream entering through the inlet 17b. The material outlet 21b communicates with a material feeder 39b which, through a discharge fitting 45b, serves a conveying duct 46b extending from the blower outlet 53b.

The second separator stage 16b has an inlet 18b, which serves as the gas outlet for the first separator stage, a material outlet 22b, and a gas outlet 20b. The inlet 18b has a tangentially arranged intake duct 86 with a sloped, partially downwardly facing intake opening 87. The gas outlet 20b is surrounded by a cylindrical skirt 88 extending downwardly in the second stage, and communicates with an exhaust conduit 25b, extending to the gas inlet 26b of the blower.

The material outlet 22b of the second separator stage 16b communicates with a discharge pipe 89 which extends to the exterior of the first separator stage and terminates at a second material feeder 90. The second material feeder communicates with the conveying duct 46b upstream from the entrance point of the material feeder 39b. A valve 91 in the conveying duct separates intake points of the respective material feeders 39b and 90. A gas supply pipe 52b communicates with the conveying duct 46b upstream of the second feeder 90 and delivers air to branch pipes 51b serving air inlets 43b of the material feeder 39b.

The second feeder 90 is driven by a sheave 92 receiving a V-belt 93 from a sheave 94 on the shaft 60b of the material feeder 39b. The shaft 60b receives its power through a speed reducer from the transfer shaft which drives the input shaft 116 via a V-belt 64b, as in the unit of FIG. 1.

The operation of the apparatus of FIG. 7 is generally similar to that of FIG. 1. The gas-material stream is separated in the first stage 15b, with the gas passing upwardly around the lower edge of the skirt 85 to enter the second stage 16b via the intake duct 86. Material collected in the first separator stage is discharged to the conveying duct 46b by the material feeder 39b with the aid of air delivered through the air inlets 43b.

In contrast to the operation of FIG. 1, material collected in the second separator stage 16b is removed through the discharge pipe 89 and delivered to the conveying duct 46b by the second feeder 90. The valve 91 is used to restrict the flow through the duct 46b at that point to force air through the gas supply pipe 52b to the feeder air inlets 43b. The remainder of the operation is substantially the same as that of FIG. 1.

The form of the invention disclosed in FIG. 7 is advantageous where the lighter or smaller material carried over by the air entering the second stage 16b is useful as product. This is especially true for high capacity units in which large carryover amounts might otherwise require frequent manual cleanout and return to storage.

Various changes may be made in the details of the invention as disclosed without departing from the scope of the invention or sacrificing the advantages thereof.

We claim:

1. Apparatus for transferring bulk materials comprising a gas-material separator having a first separator stage and a second separator stage, each separator stage having an inlet, a gas outlet and a material outlet, the inlet of the second separator stage being in communication with the gas outlet of the first separator stage, a blower having an inlet and an outlet, an exhaust conduit extended from the gas outlet of the second separator stage to the inlet of the blower, a gas supply duct extended from the outlet of the blower to receive a stream of gas therethrough and connected to deliver the gas stream to a discharge assembly comprising a material feeder communicating with the material outlet of the first separator stage, the inlet of the second separator stage and the gas outlet thereof both being in the upper portion of said stage, a gas-impermeable baffle extending across the second separator stage between the inlet and outlet thereof and extending downwardly from the top thereof to a level below that of the lower portion of both the inlet and outlet thereof, so that gas-material introduced into said second separator stage is caused to travel in a U-shaped path from the inlet to the outlet, whereby separation of material entrained by the gas in said second separator stage is facilitated, a conveying duct positioned to receive material from the discharge of the material feeder, and means for driving the blower from the material feeder.

2. Apparatus for transferring bulk materials comprising a gas-material separator having a first separator stage and a second separator stage, each separator stage having an inlet, a gas outlet, and a material outlet, the inlet of the second separator stage being in communication with the gas outlet of the first separator stage, a blower having an inlet and an outlet, an exhaust conduit extended from the gas outlet of the second separator stage to the inlet of the blower, a gas supply duct extended from the outlet of the blower to receive a stream of gas therethrough and connected to deliver the gas stream to a discharge assembly comprising a material feeder communicating with the material outlet of the first separator stage, a conveying duct positioned to receive material from the discharge of the material feeder, means for transmitting power to the blower and the feeder, said transmission means including a speed reducer mounted for limited rotation about an axis and having a driven shaft eccentric to said axis, belt and sheave means connecting said driven shaft to said blower, means for holding said sheave in position to apply tension on said belt, including a link pivotally connected at one end to said speed reducer and anchored at its other end, said link including an overload release operable upon a shifting of the position of the link, whereby when the feeder is overloaded or jammed, said speed reducer will be partially rotated about its axis and change the position of said link to bring about actuation of said overload release and thereby remove driving tension from the belt.

3. Apparatus for transferring bulk materials comprising a gas-material separator having a first separator stage and a second separator stage, each separator stage having an inlet, a gas outlet, and a material outlet, the inlet of the second separator stage being in communication with the gas outlet of the first separator stage, a blower having an inlet and an outlet, an exhaust conduit extended from the gas outlet of the second separator stage to the inlet of the blower, a gas supply duct extended from the outlet of the blower to receive a stream of gas therethrough and connected to deliver the gas stream to a discharge assembly comprising a material feeder communicating with the material outlet of the first separator stage, a conveying duct positioned to receive material from the discharge of the material feeder, means for transmitting power to the blower and the feeder, the gas supply duct including a branch duct leading to the casing portion of the material feeder which is open to the conveying duct to facilitate discharge of material from the material feeder, the branch duct communicating with the gas supply duct upstream of the discharge of the material feeder, and a valve located in the gas supply duct intermediate the points of communication of the branch duct and the feeder with the gas supply duct.

References Cited in the file of this patent

UNITED STATES PATENTS

| 611,569 | Duckham | Sept. 27, 1898 |
| 2,779,634 | Atkinson | Jan. 29, 1957 |

FOREIGN PATENTS

| 750,830 | Great Britain | June 20, 1956 |